United States Patent [19]

Faudou et al.

[11] Patent Number: 4,741,456
[45] Date of Patent: May 3, 1988

[54] CRYOGENIC RESERVOIR WITH HELICALLY WOUND THERMAL INSULATION

[75] Inventors: Jean-Yves Faudou, Suce S/Erdre; Bernard Simon, Le Plessis-Trevise, both of France

[73] Assignee: L'Air Liquide, Societe Anonyme pour l'Etude et l'Exploitation des Procedes Georges Claude, Paris, France

[21] Appl. No.: 854,580

[22] Filed: Apr. 22, 1986

[30] Foreign Application Priority Data

Apr. 23, 1985 [FR] France ................... 85 06131
Jun. 5, 1985 [FR] France ................... 85 08471

[51] Int. Cl.$^4$ .................... B65D 25/18; B65D 8/02
[52] U.S. Cl. ........................ 220/414; 220/3; 220/421
[58] Field of Search ............ 220/3, 414, 83, 420, 220/421, 423

[56] References Cited

U.S. PATENT DOCUMENTS 3,358,867 12/1967 Skinner .
4,120,421 10/1978 Prost .

FOREIGN PATENT DOCUMENTS 1517399 2/1968 France .
2345658 10/1977 France .

Primary Examiner—George E. Lowrance
Attorney, Agent, or Firm—Young & Thompson

[57] ABSTRACT

A reservoir for a cryogenic fluid comprises a vessel with an elongated filling neck. It is thermally insulated by means of a band of thermal insulating material wound around the neck and the vessel in a plurality of superimposed layers each of which has an edge adjacent the neck and an edge remote from the neck. A cord is helically wound around the neck in a plurality of turns. Each turn of the cord contacts the adjacent edge, as defined above, of each layer.

8 Claims, 4 Drawing Sheets

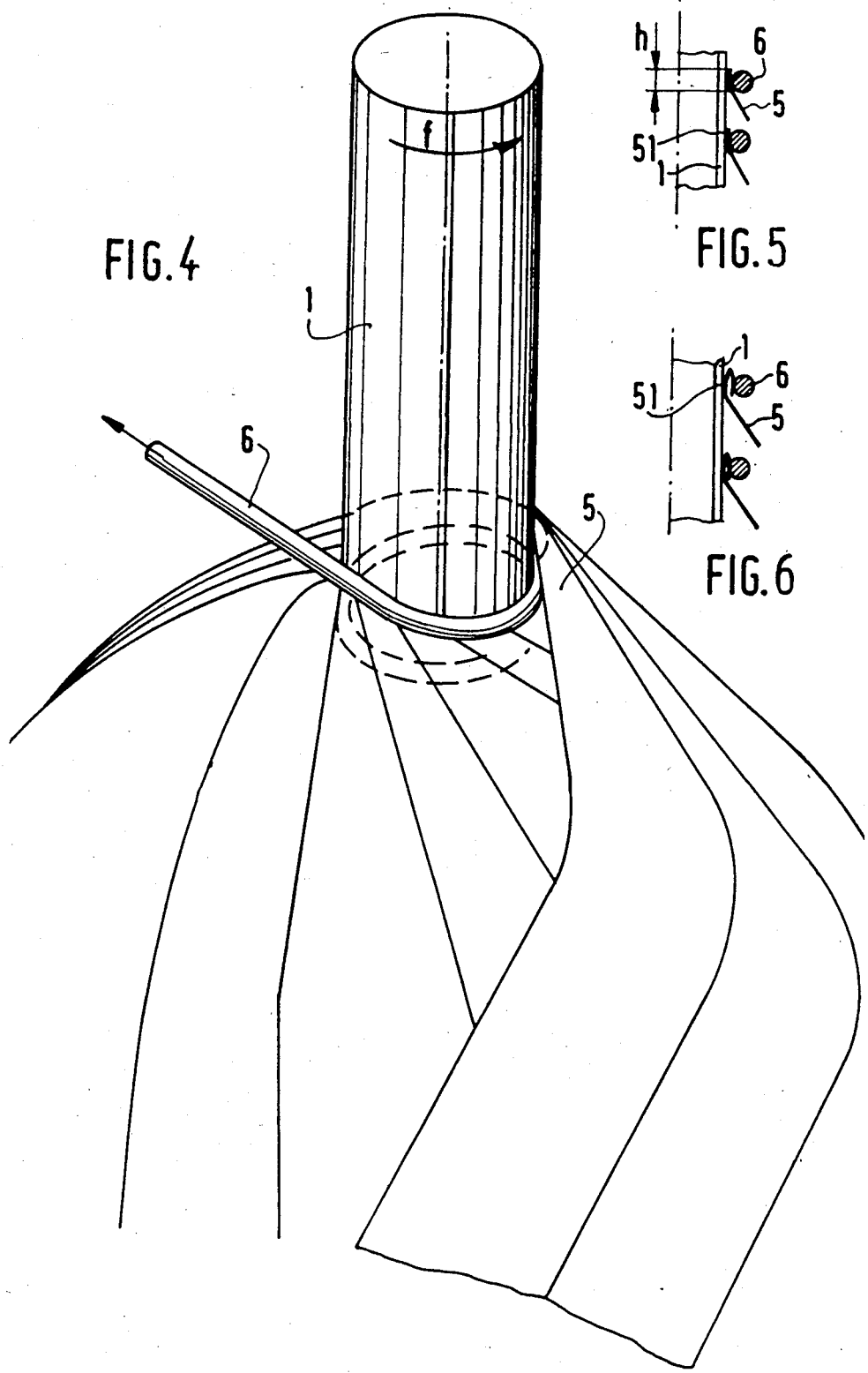

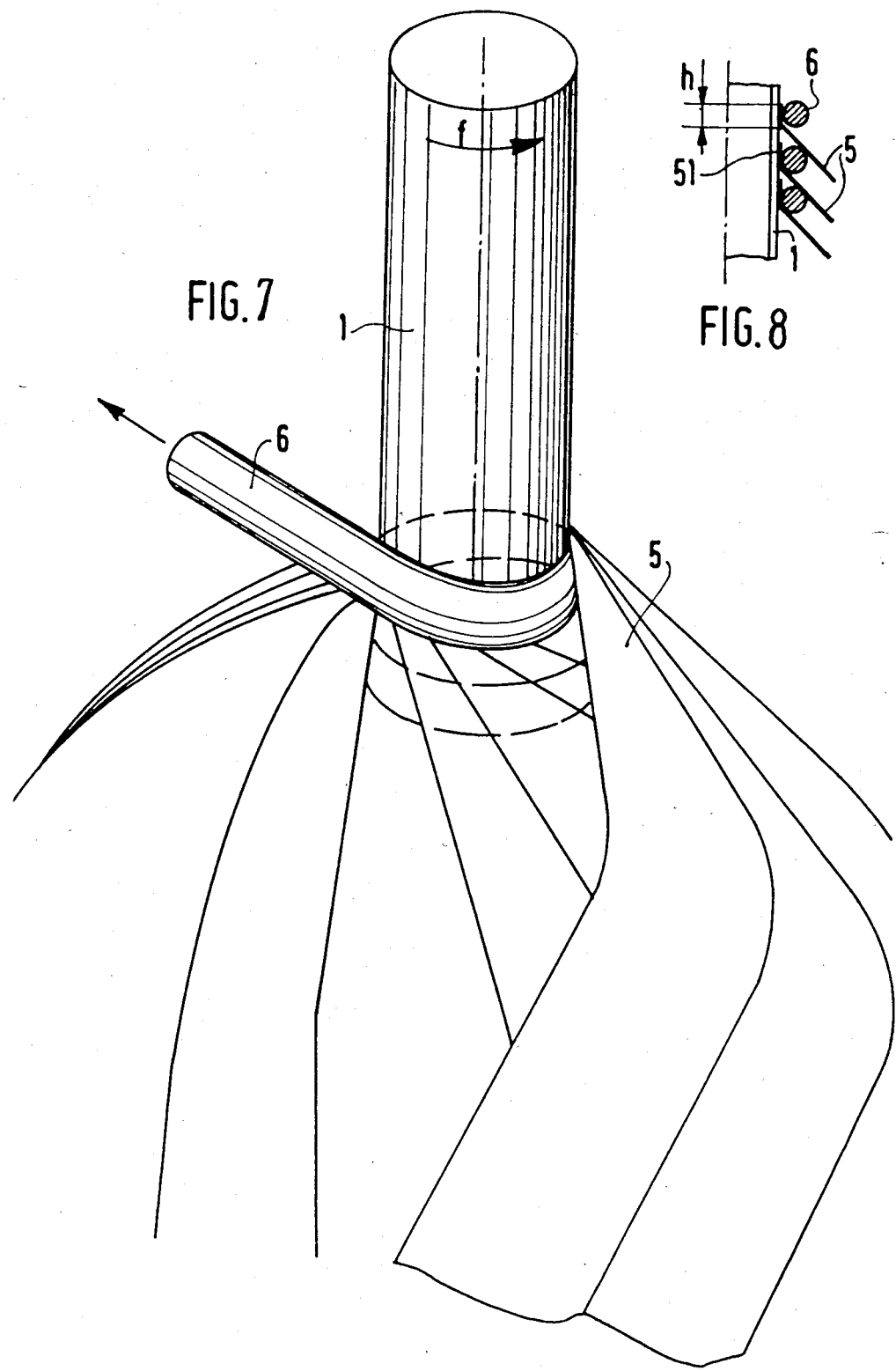

CRYOGENIC RESERVOIR WITH HELICALLY WOUND THERMAL INSULATION

The present invention relates to a multi-layer thermal insulation around and along a solid passage, in particular a filling neck of a reservoir for containing a cryogenic fluid, in which at least one band of thermal insulating material is wound around the passage and the vessel of the reservoir by forming a plurality of superimposed layers.

There are used in the industry reservoirs for cryogenic fluids, in this case liquified gases such as helium or liquid nitrogen. These "open" reservoirs, still termed "Dewar" reservoirs, generally comprise a vessel of aluminium or stainless steel, in the orifice of which is engaged and fixed a cylindrical filling neck which may be of plastics material or stainless steel. These reservoirs must be covered with a high-performance thermal insulation layer in order to avoid an excessively rapid evaporation of the stored liquid. This insulation layer is usually formed by the winding of at least one insulating band completely around the vessel and also throughout the height of the filling neck. The insulating band or bands are wound by means of an insulating machine which winds the insulating band or bands around the vessel and the neck of the reservoir while the latter is driven in rotation about its axis.

In order to achieve an excellent insulation in the region of the filling neck, a good connection of the layers forming insulation screens must be obtained throughout the height of this neck so as to protect as far as possible the neck, throughout its height, from the radiation effects and to close off to the maximum extent the isotherms around the reservoir. Thus, in the course of the covering of the reservoir the various insulating layers constituting the thermal insulation must be progressively "raised" along the neck.

In order to achieve this raising of the insulating layers along the neck there is known a process which comprises interposing, at some regions of the neck, annular pads of insulating material, for example glass wool, these pads being disposed between groups of insulating layers. Such a process however has the drawback of requiring the stopping of the machine to enable the interposed pads to be placed in position.

Another known process comprises periodically fixing on the neck, on the exterior of the latter, annular collars above a group of insulating layers while leaving a vacuum between each collar and the subjacent group of insulating layers. Here again, the machine must be stopped for placing the collars in position on the neck.

Another known process comprises folding each insulating layer back onto itself in the region of the neck. This process is the most commonly employed at the present time since it may be carried out automatically. On the other hand, with this process, the number of insulating layers is in practice imposed by the length of the neck, which may result, in the case of a reservoir having a very long autonomy and a long neck, in an excessive amount of insulating layers having an adverse effect on the weight and the overall size of the reservoir.

The invention therefore provides a multi-layer thermal insulation around and along a solid passage, in particular a filling neck of a reservoir for containing a cryogenic fluid, formded by winding around the passage and the vessel of the reservoir at least one band of thermal insulating material by forming a plurality of superimposed layers, wherein each place of contact of the band with the passage is fixed by means of a cord helically applied to said passage.

In a first manner of carrying out the invention, the cord is first of all wound around the passage just before the application of the insulting band and the successive insulating layers are then applied in such manner that they bear, in the region where they are in contact with the passage, on the previously-wound helical cord and are superimposed on each other along this cord.

In a second manner of carrying out the invention, there is applied to the passage, for each insulating layer, first of all the insulating band so that the inner marginal portion of this band covers a small fraction of the length of the passage and then the cord is wound on this marginal portion and fixes it on the passage.

In a third manner of carrying out the invention, the cord is previously wound helically on the passage and fixed on the entire useful length of this passage, and then the band is wound around the passage and the vessel of the reservoir so that this band bears against the cord at each place of contact with the passage.

The invention affords the advantage of permitting the obtainment of the desired distribution along the passage or the neck of the vessel of the same number of insulating layers as that of the layers normally used for the insulation of the vessel. By suitably choosing the nature, the mean diameter, the pitch and the winding diameter of the support which the helical insulating cord constitutes, it is possible to encompass a wide range of characteristics. In particular, the pitch of the helical cord may be constant or variable along the passage.

There will now be described hereinafter, as non-limiting examples, some embodiments of the present invention with reference to the accompanying drawings, in which:

FIG. 4 is a partial perspective view of the upper part of another cryogenic fluid reservoir in the course of the manufacture of the insulation on the vessel of the reservoir and around the neck of the latter, according to the invention;

FIG. 5 is a partial longitudinal sectional view of the neck covered with successive insulating layers according to FIG. 4;

FIG. 6 is a view similar to FIG. 5 but corresponding to a modification;

FIG. 7 is a view similar to FIG. 4 illustrating a limit case of FIGS. 1 and 4, and FIG. 8 is a view similar to FIGS. 5 and 6, but corresponding to FIG. 7.

Figure 1:
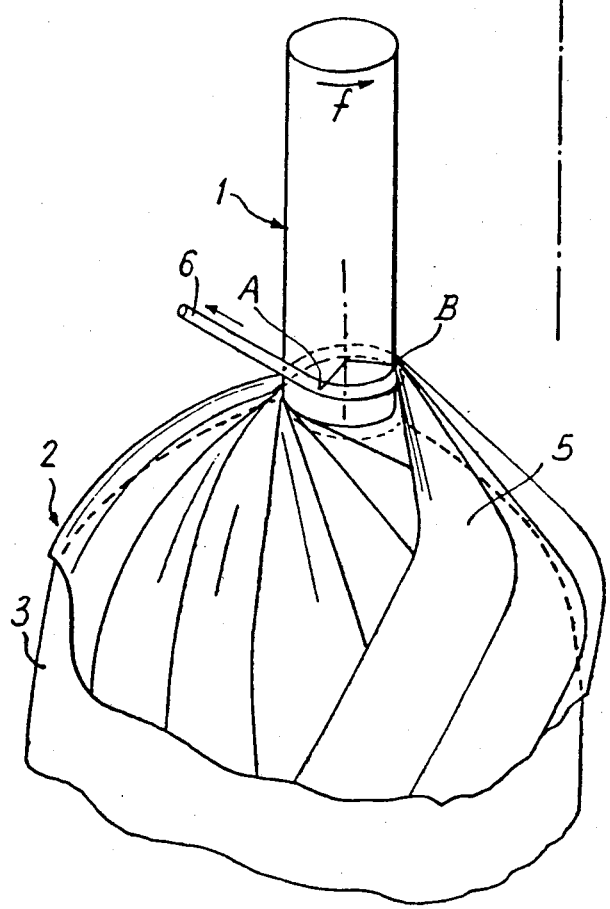
FIG. 1 is a partial perspective view of the upper part of a cryogenic fluid reservoir in the course of manufacture of the insulation on the vessel of the reservoir and around the neck of the latter, according to the invention.
Figure 2:
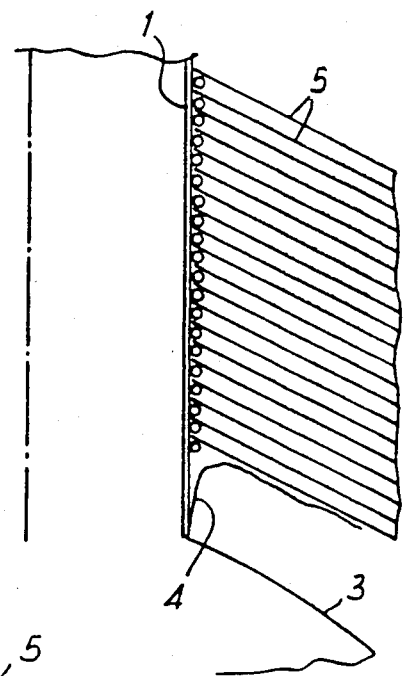
FIG. 2 is a diagrammatic axial semi-sectional view of the neck of the reservoir covered with successive insulating layers.

As illustrated in FIGS. 1 and 2, the invention has for purpose to achieve a perfect insulation of a solid passage, in the present case the cylindrical neck 1 of a cryogenic fluid reservoir 2 having a vessel 3 of aluminium, stainless steel or other material, including a plastics material. The filling neck 1 is fixed to the vessel 3 by any suitable means along an upper flange 4 which borders the orifice of the vessel 3.

The thermal insulation of the reservoir 2 is provided by surrounding the neck 1 and the vessel 3 with an insulating band 5 forming a succession of superimposed insulating layers or turns evenly arranged around the axis of the reservoir 2. This covering is achieved by means of a machine which will be described hereinafter in detail with reference to FIG. 3. The insulating band 5 is of any suitable type: it may be formed in particular by the superimposition of a thin sheet of aluminium forming a reflector, and a sheet of insulating paper forming an interpolated sheet.

According to the invention, there is wound onto the neck 1, a little before the application of the insulating layers 5, a "string" or cord 6 in such manner that this cord constitutes a helical winding on the neck 1. The term cord is intended to mean any elongated flexible body capable of being wound in a helix. This cord or "string" may be of any thermally insulating material compatible with the utilization and manufacture of the concerned equipment. It may be in particular made from the same material (paper) as that constituting the interpolated sheet of the insulating band 5, or of polypropylene. The use may also be envisaged of "strings" or cords previously coated with adhesive which would then be rendered integral with the neck upon polymerization of the adhesive. The "string" or cord may also be coated with a layer of intumescent resin so as to increase the bearing zone of the insulating layers 5.

As will be seen hereinafter, the helical insulating cord 6 and the insulating layers 5 are applied while the whole of the reservoir 2 is driven in rotation about its axis. As can be seen in FIG. 1, the insulating cord 6 comes into contact with the peripheral surface of the neck 1 at a point A while being tangent to this surface at this point, and each insulating layer 5 leaves the neck 1 and then covers the vessel 3 at a point B while being substantially tangent to the neck at this point. The point A is at the rear of the point B with respect ot the direction of rotation of the reservoir 2 shown by the arrow f in FIG. 1 (clockwise direction), by an angle which may be for example about 90°. The effect of this is that the insulation cord 6 is applied against the surface of the neck 1 at the point A hich is about one quarter of a rotation before there is applied at this same point A a turn of the insulating band 5.

As can be seen in FIGS. 1 and 2, the successive insulating layers 5 bear, by their edges close to the neck 1, on the successive turns of the insulating cord 6 which was previously helically wound on the neck 1. Thus, it can be seen that it is possible, by suitably choosing the nature, the mean diameter, the pitch and the winding diameter of the insulating cord 6 which forms a support for the insulating layers 5, to encompass a wide range of characteristics of insulation in the zone of the neck 1.

The insulating helical cord 6 thus permits a judicious distribution along the neck 1 of the insulating layers 5 in contact with the neck in this region, and the number of turns formed by the cord 6 on the neck 1 corresponds to the number of the required superimposed insulation layers for the complete insulation of the reservoir 2.

Figure 3:
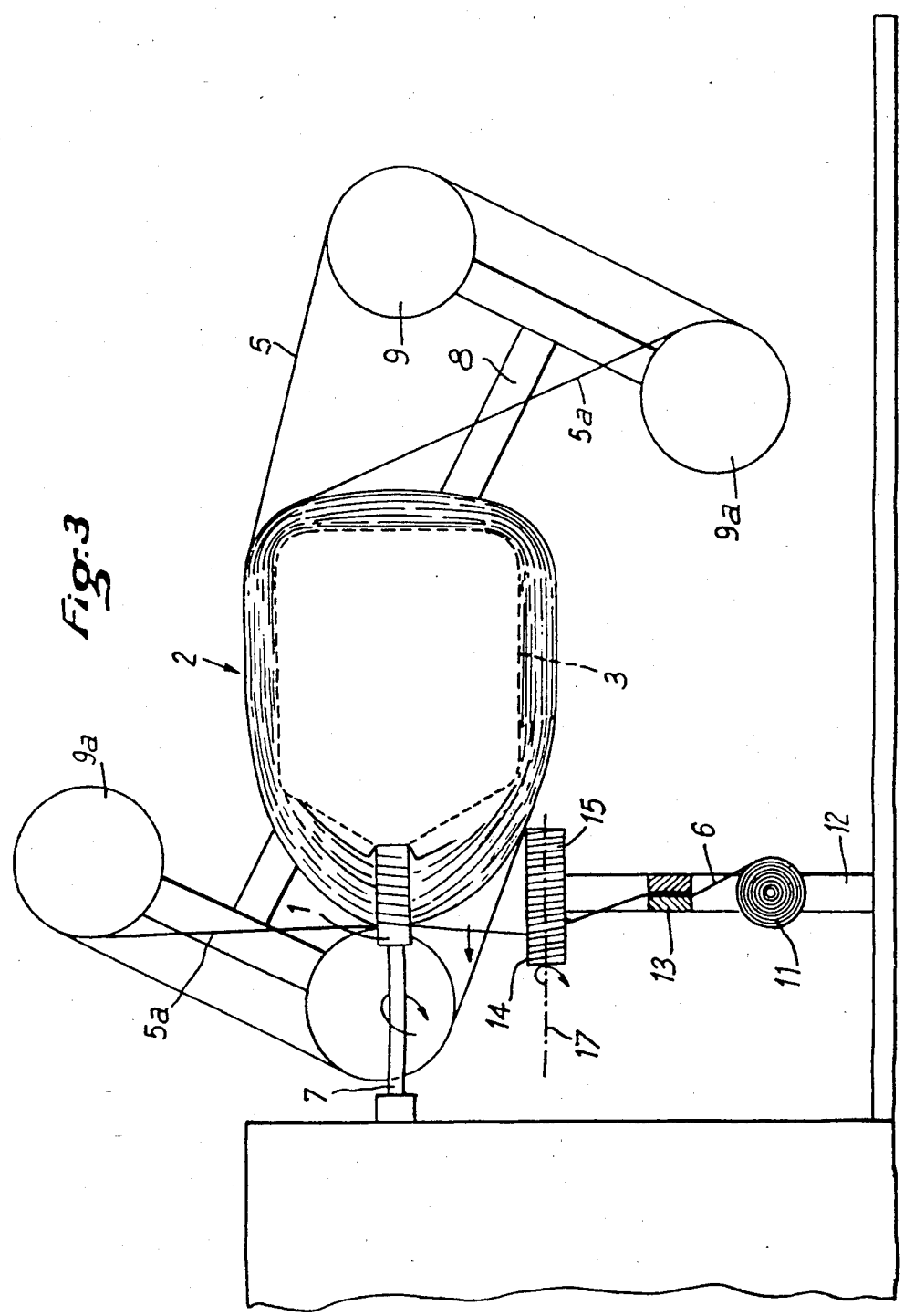
FIG. 3 is a diagrammatic elevational view of an insulating machine for producing the invention.

FIG. 3 shows an insulating machine whereby it is possible to achieve the perfect insulation of a reservoir such as that shown in FIGS. 1 and 2. This machine comprises a horizontal shaft 7 which is driven in rotation and on which is mounted and fixed in position the neck 1 of the reservoir 2 so as to drive the whole of the reservoir 2 in rotation about its axis, i.e. the axis of the horizontal driving shaft 7. The machine further comprises a taping system 8 which includes reels 9 of insulating bands 5 and optionally reels 9a of very thin bands 5a of aluminium (reflector), this taping system 8 being rotatively mounted in the known manner on a horizontal shaft inclined with respect to the axis of the shaft 7 and intersecting this axis.

According to the invention, the machine includes a reel 11 rotatively mounted on a support 12 from which a "string" or insulating cord 6 is unwound. This cord 6 then passes through a brake 13 which ensures a regular tension of the cord 6, then around the unwinder 14 parallel to the neck 1 of the reservoir and in transverse alignment with this neck. This unwinder 14 is formed by a cylindrical body having the same diameter as the neck 1 of the reservoir and in the peripheral surface of which is provided a screwthread 15. This cylindrical body is rotatively mounted in such manner as to be free to turn about its horizontal axis 17 which is parallel to the axis of the shaft 7. The cord 6 is wound in the screwthread 15 of the cylindrical body in such manner as to form at least one turn and it then leaves the cylindrical body and extends in the direction toward the neck 1 onto which it is wound in a helix. The pitch of the screwthread of the unwinder 14 depends on the desired pitch of the helical winding of the cord 6 on the neck 1.

At the beginning of an insulating operation, the insulating cord 6 is fixed to the lower part of the neck 1, i.e. in the immediate vicinity of the vessel of the reservoir. When the machine is started up, the reservoir 2 is driven in rotation about its axis by the shaft 7 and consequently the cord 6 is wound around the neck 1. The rotation of the neck 1 is transmitted, through the cord 6, to the unwinder 14 which then rotates at the same speed as the neck 1 owing to the fact that the latter and the body of the unwinder 14 have the same diameter. As the cord 6 is engaged in the screwthread 15, this cord leaves the unwinder 14 at a point which travels in a regular manner in a direction parallel to the axis 17. Consequently, the cord 6 is progressively wound around the neck 1 on a helix whose pitch is a function of the pitch of the screwthread 15.

Consequently, if it is desired to change the distribution of the insulating layers along the neck 1 and/or the diameter of the neck, it is merely necessary to change the unwinder 14. The use of different diameters and pitches enables variable pitches to be obtained for the helix formed by the cord 6.

The same reference numerals as in FIGS. 1 to 3 have been used in FIGS. 4 to 8 to designate corresponding elements.

In FIG. 4, the band 5 is applied, for each layer, first of all to the neck 1 so that its inner marginal portion 51 covers a small fraction h of the length of the neck, as shown in FIG. 5. During a fraction of a rotation of the reservoir, the contact between the band and the neck is maintained by simple friction, since the cord 6 is applied against the marginal portion 51 and fixes the latter against the neck. In this way, the configuration illustrated in FIG. 5 is obtained.

It will be understood that this manner of winding can be carried out automatically with the machine illustrated in FIG. 3 merely by changing the conditions of the beginning of the winding.

In order to increase the strength of the band upon its contact with the neck, its inner marginal portion 51 can be folded onto itself (FIG. 6) before it is applied to the neck so that it is a double thickness of the band which is fixed between the neck and cord.

If the diameter of the cord 6 is increased and/or its winding pitch is decreased, the limit case shown in FIGS. 7 and 8 is reached in which each layer has a marginal portion 51 fixed by a turn of the cord, as before, and moreover bears against the preceding turn, as in FIGS. 1 to 3. It will be understood that the same result may be obtained by proceeding as described with reference to FIGS. 1 to 3, i.e. by applying to the neck first of all the cord 6 and then the band 5 in respect of each layer.

In another modification, the cord 6, previously coated with an adhesive, is wound helically and fixed throughout the useful length of the neck 1, and then the insulating layers are wound. In this case, only a single bearing of the successive layers can of course be obtained on the cord 6.

What is claimed is:

1. A reservoir for a cryogenic fluid comprising an elongated filling neck and a vessel and thermally insulated by means of at least one band of thermal insulating material wound around the neck and the vessel and forming a plurality of superimposed layers each of which has an edge adjacent the neck and an edge remote from the neck, and a cord helically wound around the neck in a plurality of turns and which contacts a said adjacent edge of each said layer.

2. A reservoir as claimed in claim 1, wherein said adjacent edge of each said layer bears, in a region wherein it is in contact with the neck, against the previously-wound helical cord, said layers being in superimposed relation along said cord.

3. A reservoir as claimed in claim 1, wherein, for each said layer, said adjacent edge covers a small fraction of the length of the neck, the cord being wound onto said adjacent edge thereby fixing the latter against the neck.

4. A reservoir as claimed in claim 3, wherein said adjacent edge is folded onto itself between said neck and said cord.

5. A reservoir as claimed in claim 1, wherein the diameter and the winding pitch of the cord are so chosen that said adjacent edge is fixed on the neck by a turn of the cord wound on said adjacent edge and bears against a preceding turn of the cord.

6. A resevoir as claimed in claim 1, wherein said cord is made of thermal insulating material.

7. A reservoir as claimed in claim 1, wherein the band is of a double type comprising an aluminum sheet forming a reflector and an insulating sheet, the material of the cord being the same as the material of the insulating sheet.

8. A reservoir as claimed in claim 1, wherein the cord is adhered to the neck.

* * * * *